United States Patent [19]

Kubach

[11] Patent Number: 4,509,715

[45] Date of Patent: Apr. 9, 1985

[54] PRESSURE CONTROL VALVE

[75] Inventor: Hans Kubach, Korntal-Münchingen, Fed. Rep. of Germany

[73] Assignee: Robert Bosch GmbH, Stuttgart, Fed. Rep. of Germany

[21] Appl. No.: 425,591

[22] Filed: Sep. 28, 1982

[30] Foreign Application Priority Data

Jul. 6, 1982 [DE] Fed. Rep. of Germany ....... 3225179

[51] Int. Cl.[3] .............................................. F16K 31/02

[52] U.S. Cl. ...................................... 251/138; 137/82; 251/141; 123/454; 335/230; 335/236

[58] Field of Search .................. 137/82; 251/138, 141; 123/454; 335/229, 230, 236

[56] References Cited

U.S. PATENT DOCUMENTS

| | | | |
|---|---|---|---|
| 2,436,354 | 2/1948 | Burke et al. | 335/230 |
| 2,437,270 | 3/1948 | Peek, Jr. | 335/230 X |
| 2,790,427 | 4/1957 | Carson | 137/82 X |
| 3,588,769 | 6/1971 | Buckwalter | 335/230 |
| 3,714,610 | 1/1973 | Duff et al. | 335/229 |
| 3,892,260 | 7/1975 | Lucien | 137/82 X |

FOREIGN PATENT DOCUMENTS

| | | | |
|---|---|---|---|
| 0060344 | 9/1982 | European Pat. Off. . | |
| 930878 | 7/1955 | Fed. Rep. of Germany | 335/229 |
| 3109560 | 9/1982 | Fed. Rep. of Germany . | |
| 500829 | 11/1954 | Italy | 335/230 |
| 934498 | 8/1963 | United Kingdom | 335/229 |

OTHER PUBLICATIONS

*Fluid Power Control;* Blackburn et al.; 1960; Ch. 11; The Technology Press of MIT and John Wiley & Sons.

*Primary Examiner*—A. Michael Chambers
*Assistant Examiner*—John C. Fox
*Attorney, Agent, or Firm*—Edwin E. Greigg

[57] ABSTRACT

A pressure control valve with an impact plate which serves as a regulator for a specific drop in pressure. The pressure control valve includes an armature disposed in an electromagnetic field established by an electromagnetic coil and a permanent magnetic field, with the armature being rotatably supported between two respective pole shoes located on each side of the armature. The pole shoes located on one side of the armature, in contrast to the pole shoes located on the other side, have an opposing magnetic polarity induced by the permanent magnet. The pole shoes which are not aligned opposite one another on armature 85, are approached by armature 85 with movement of the impact plate toward a valve seat, and causes an increase in the air gap planes facing the armature, as compared to the other two pole shoes, and thereby establishes a non-linear characteristic for the pressure control valve.

2 Claims, 4 Drawing Figures

PRESSURE CONTROL VALVE

BACKGROUND OF THE INVENTION

The invention is based on a pressure control valve which may be used for a fuel injection system. A known pressure control valve has a linear characteristic between induction current I for the electromagnet, and a pressure difference regulated by the pressure control valve for an induction current I greater than zero. To achieve these linear characteristics, a non-linear electronic element, involving extensive input and expenditures, is provided. Also, the stability of the system becomes critical with an induction current equal or near zero, since even minor variations of the induction current will result in major changes of the pressure difference.

OBJECTS AND SUMMARY OF THE INVENTION

The pressure control valve according to the invention has the advantage that a non-linear characteristic, specifically for an induction current I exceeding zero, exists in the form of an aperture of a secondary variable between the induction current I of the electromagnet and the regulated pressure difference at the pressure control valve, thus simplifying the electronics. Furthermore, the regulated pressure difference at an induction current of I equal or near zero is stabilized. The measures described herein will allow for advantageous extensions and improvements of the defined pressure control valve.

BRIEF DESCRIPTION OF THE DRAWINGS

One exemplary embodiment of the invention is shown in simplified form in the drawings and will be discussed in detail below.

DESCRIPTION OF THE PREFERRED EMBODIMENT

Figure 1:
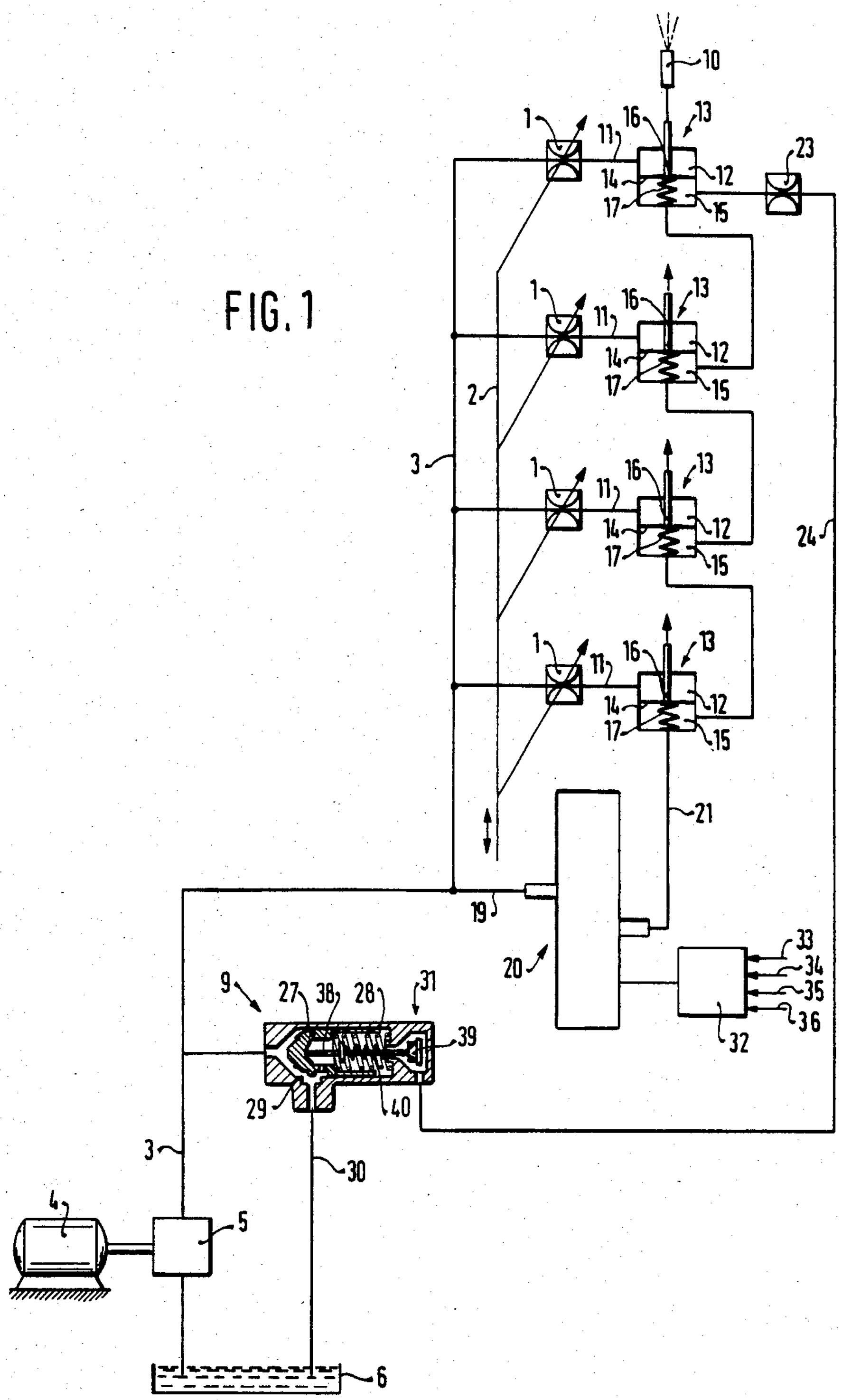
FIG. 1 shows a fuel-injection system with a pressure control valve.

In the fuel injection system according to the example in FIG. 1 there are metering valves 1 with each separate valve associated with each separate cylinder of a mixture-compressing internal combustion engine having externally supplied ignition. A quantity of fuel metered by each separate valve is in a specific proportion to a quantity of air aspirated by the engine. The fuel injection system shown by way of example has four metering valves 1 and is thus intended for a four-cylinder fuel combustion engine. The cross section of the metering valves is, for example, variable, as indicated, by means of an actuation element 2 in accordance with operating characteristics of the engine. One operating characteristic for varying the cross section can be the quantity of air aspirated by the engine. The metering valves 1 are located in branch lines of a fuel supply line 3, into which fuel is pumped from a fuel container 6 by a fuel pump 5 driven by an electric motor 4. A pressure limitation valve 9 is disposed in a branch line of the fuel supply line 3 and limits the fuel pressure prevailing in the fuel supply line 3, permitting the fuel to flow back into the fuel container 6 if the fuel pressure exceeds a certain desired value.

A line 11 connects to each of the metering valves and downstream of each metering valve 1, to a regulating chamber 12 of a regulating valve by way of which the metered fuel proceeds into the regulating chamber 12 of the regulating valve 13 from each of the metering valves. One regulating valve is assigned to each metering valve 1. The regulating chamber 12 of the regulating valve 13 is separated by a movable valve element embodied as a diaphragm 14 from a control chamber 15. The diaphragm 14 of the regulating valve 13 cooperates with a fixed valve-seat 16 provided in the regulating chamber 12, by way of which valve-seat 16 the metered fuel can flow out of the regulating chamber 12 to the individual injection valves 10 in the intake tube of the engine, of which only one is shown. Each control chamber 15 is interconnected to each other and comprises a backing spring 17 which retains diaphragm 14 at the valve seat 16 when the engine is shut off.

A line 19 branches off from the fuel supply line 3 and discharges via an electromagnetically actuatable pressure control valve 20 (shown in FIG. 2) into a control pressure line 21. Downstream of the pressure control valve 20 the control chambers 15 of the regulating valves 13 are connected to the control pressure line 21, and downstream of the control chambers 15 a control throttle 23 is connected to the control chambers 15 and an outflow line 24. Fuel can flow out of the control chambers 15 into an outflow line 24 by way of the control throttle 23. The control pressure valve is triggered by an electronic control device 32 which operates in accordance with appropriately furnished operating characteristics of the fuel-combustion engine, such as rpm 33, throttle valve position 34, temperature 35, exhaust composition (oxygen sensor) 36 and others. The pressure control valve is triggered by the electronic control element 32 in either analog or clocked fashion. In the non-excited state of the pressure control valve 20, by means of suitable spring forces or permanent magnets, it is possible that a pressure difference is provided at the pressure control valve 20 which assures emergency operation of the engine even in the case of failure of the electronic control element 32.

The pressure regulating valve 9, shown by way of example in the drawing, has a regulating piston 27 which can be displaced counter to the force of a regulating spring 28 by the pressure of the fuel in supply line 3 so that fuel can flow over a regulating edge 29 to a return-flow line 30 and back to the fuel container 6. A blocking valve 31 can simultaneously be unseated by the regulating piston 27 as the regulating piston effects an opening operation. To this end, the regulating piston 27, as it effects an opening operation and while the fuel pump 5 is pumping, engages an actuating pin 38 which displaces the movable valve element 39 of the blocking valve 31 in the opening direction counter to the force of a blocking spring 40. If the engine is shut off, then no further fuel supply is effected via the electric fuel pump 4, 5, and the pressure regulating valve 9 closes. At the same time, the blocking spring 40 engaging the actuating pin 38 displaces the movable valve element 39 of the blocking valve 31 into the closed position.

Downstream of the control throttle 23, the outflow line 24 is connected to the blocking valve 31 so that the fuel reaches the blocking valve 31 via the control valve 23. When the fuel pump is not pumping, the closed blocking valve 31 prevents fuel from leaking out of the control pressure line 24, and thus allows the fuel injection system to remain filled with fuel for the next time the engine is started.

Figure 2:
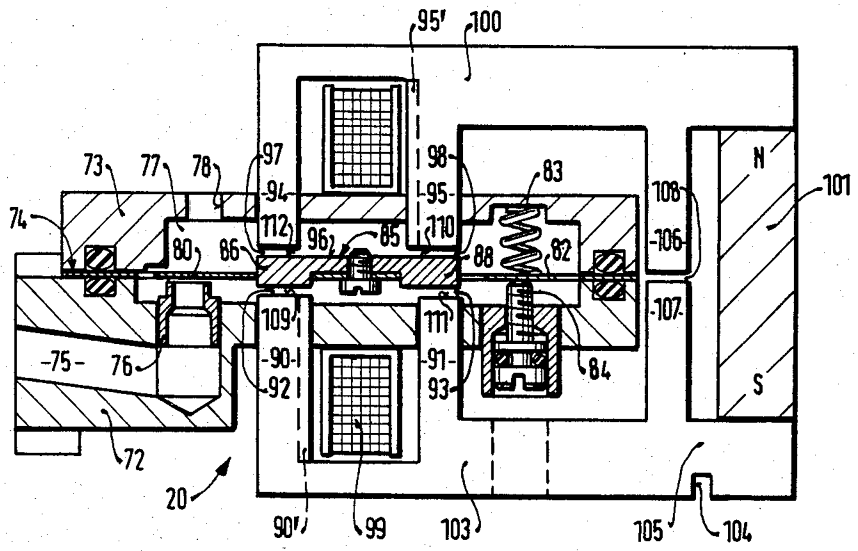
FIG. 2 is a schematic view of the pressure control valve shown in block form in FIG. 1.
Figure 3:
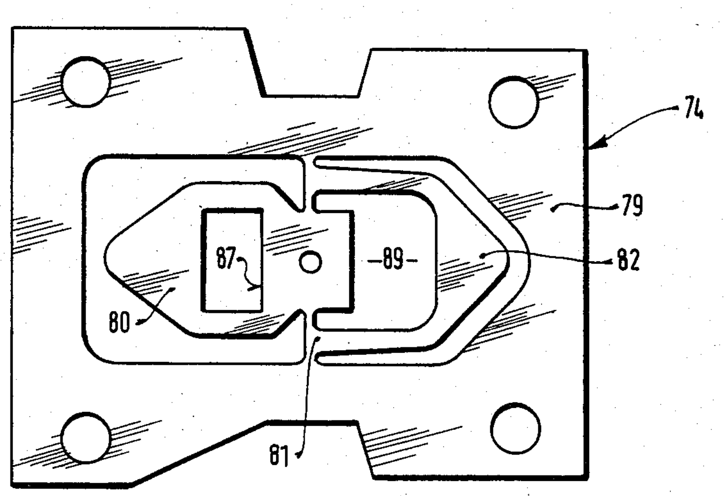
FIG. 3 illustrates a regulator diaphragm of a pressure control valve.
Figure 4:
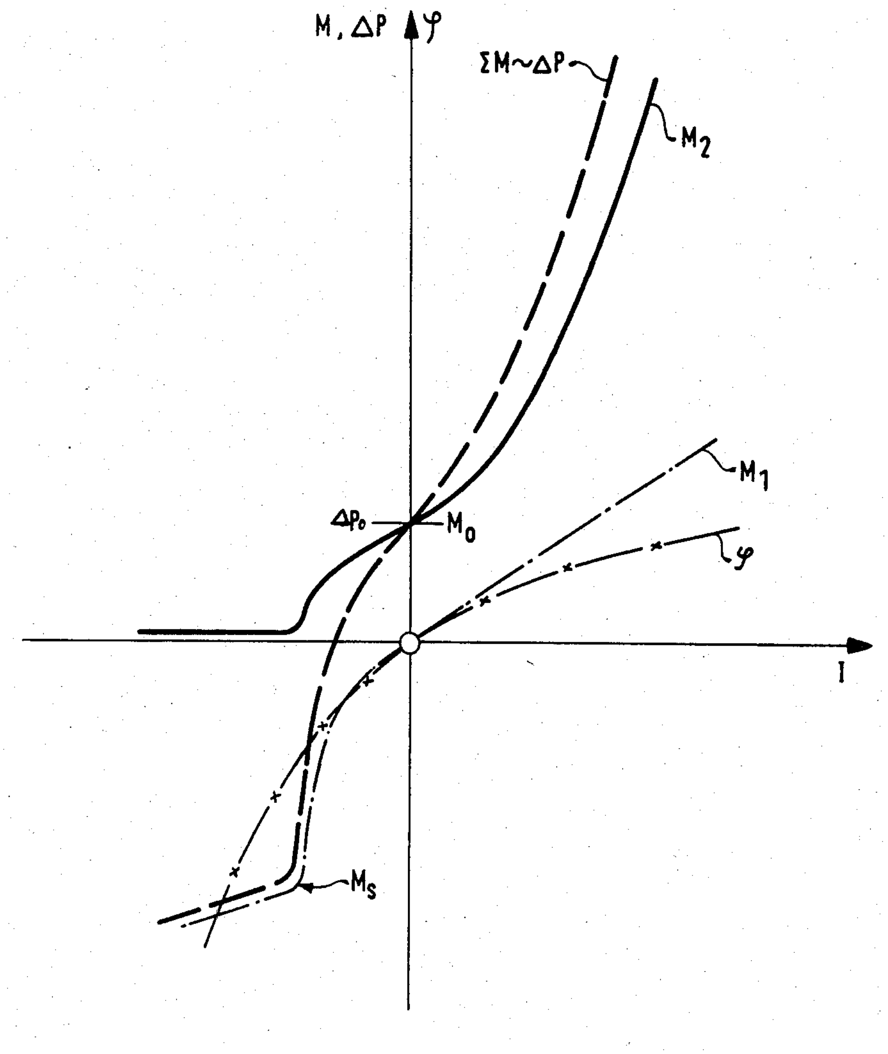
FIG. 4 is a diagram showing the flow of the difference pressure $\Delta p$ regulated at the pressure control valve, the flow of the torque M, and the angle of rotation $\rho$ in dependency of induction current I.

An exemplary embodiment of a pressure control valve according to the invention is shown in FIG. 2. A guide diaphragm 74 is thereby fastened between a lower housing half 72 and upper housing half 73 and is shown in plan view in FIG. 3. An inlet-opening 75 communicates wth line 19, and thus with fuel supply line 3. The inlet-opening 75 discharges into a work chamber 77 which is enclosed by the lower housing section 72 and the upper housing section 73 via a vertically disposed nozzle 76 which acts as a valve seat. From the work chamber 77, a discharge opening 78, embodied by way of example in the upper housing half 73, leads to the control pressure line 21. The guide diaphragm 74 has a fastening area 79 fastened between the two housing halves 72, 73. A control area 80 is cut out of guide diaphragm 74 and is connected on one end with a torsion area 81, while its other end is freely movable. Remote from control area 80, a spring area 82 is also cut out of the guide diaphragm 74 and is connected with the torsion area 81. A compression spring 83 is supported on one end on the upper housing section 73, and on the other on spring area 82, pressing this spring area against an adjusting screw 84, which is threaded into the bottom housing half 72 and protrudes into work chamber 77. An axial adjustment of the adjusting screw 84 results in a corresponding prestressing of the spring area 82 as a result of which the control area is pressed, to a greater or lesser extent, against nozzle 76 which protrudes from the bottom housing section 72 into the work chamber 77. As a result, in the case of relatively large regulated pressure differences, an over-proportional ratio exists between the pressure differences and the induction current of the control pressure valve 20. The control area 80 acting as an impact plate, together with the nozzle 76, thus forms a valve of a nozzle/impact plate type. A disc-shaped armature 85 is symmetrically disposed with the torsion area 81, forming a torsion axis, and communicates with the control area 80. Armature 85 with an extension 86 thereby passes through an aperture 87 in the control area 80, whereas a further extension 88 passes through an aperture 89. The elastic suspension is almost friction free, and thus avoids hysteresis. A pole 90 extends through the lower housing half 72 and protrudes into the work chamber 77 in the direction of the extension 86 of the armature 87, while an additional pole shoe 91 is disposed in the lower bottom half 72 and protrudes into work chamber 77 in the direction of extension 88 of armature 85. An air gap 92 is developed between pole shoe 90 and extension 86, and an air gap 93 between extension 88 and pole shoe 91. In alignment with pole shoe 90, a pole shoe 94 protrudes into work chamber 77 through the upper housing half 74, and pole shoe 91 in alignment with pole shoe 95 in identical manner. An air gap 97 is formed between pole shoe 94 and end face 96 of the armature 85, and an air gap 98 is formed between pole shoe 95 and the end face 96. On the other hand, an electromagnet coil 99 is disposed between pole shoes 90 and 91, and 94 and 95, embracing housing halves 72, 73. Pole shoes 94, 95 are disposed on a yoke 100 which rests on a permanent magnet 101; the permanent magnet is engaged at the other end by a yoke 103 which surrounds the electromagnet coil 99 and disposes pole shoes 90, 91. In a non-actuated state of the electromagnet coil 99 a pressure difference $\Delta p_o$ (FIG. 4) is established between nozzle 76 and control area 80, in accordance with the tension at the control area 80 which is predetermined via the adjusting screw 84 and the spring area 82; this pressure difference allows for sufficient fuel metering during normal operation, or for emergency operation of the engine if the electronic control unit 32 is not functioning. Yokes 100 and 103 are magnetically polarized by permanent magnet 101 so that the magnetic field of the permanent magnet 101 extends on one side from yoke 100 via pole shoe 95, the air gap 98, the armature 85, the air gap 93 and the pole shoe 91 to yoke 103, while on the other side the magnetical field extends via pole shoe 91 to yoke 103. In a non-actuated state of the electromagnetic coil 99, i.e., an induction current of $I=0$, the permanent magnet forces do not result in any significant engine torque on the armature 85, thus establishing a pressure difference of $\Delta p_o$ on the nozzle 76 of the pressure control valve 20 as shown in FIG. 4; the pressure difference is established independent of the magnetization of the permanent magnet 101 and is thus constant.

Now, if a positive induction current I is supplied to the electromagnetic coil 99, then an electromagnetic field develops in a specific direction, for example, at one side from pole shoe 95 via air gap 98, the armature 85, the air gap 97 to pole shoe 94, and on the other side from pole shoe 91 via the air gap 93 to armature 85, and via air gap 92 to pole shoe 90. The magnetic flow of the electromagnetic field and permanent magnetic field thus extends into the air gaps 92 and 98, each in the same direction. The fluxes are thereby added together while the magnetic fields of the electromagnet and permanent magnet extend in opposite direction into air gaps 93 and 97 so that these are subtracted from one another. Thereby the extension 86 of armature 85 is attracted more strongly to pole shoe 90, and the other end of armature 85 more strongly to pole shoe 95, whereby the control area 80 is pivoted around the torsion area 81 closing the nozzle 76 to a greater extent, so that a higher differential pressure $\Delta p$ is established. Thereby a specific ratio prevails between induction current I and the differential pressure $\Delta p$. By superimposing an electromagnetic circuit on a permanent magnetic circuit, a substantially lower regulating power is required. Furthermore, by correspondingly weakening or strengthening the permanent magnet 101 the regulating or adjusting characteristic of the pressure control valve 20 can be influenced in the desired manner. By reversing the direction of induction current I, the armature 85 is more strongly attracted to pole shoes 94 and 91, so that the control 86 opens nozzle 76 to a greater extent with virtually no pressure difference $\Delta p$ at nozzle 76. As a result, and because of the addition of the pressure of the closing spring 17 and the fuel pressure force in the control chamber 15, the regulating valves 13 close. It is thereby possible to achieve a desired disruption of fuel injection by reversing the current, at relatively low electrical power for the pressure control valve 20, in the instance where the control signals characterizing an engine overrun are present, i.e., rpm above idling rpm and closed throttle valve.

Yoke 103 comprises a recess 104 which leads to a magnetic constriction 105 within yoke 103. At an induction current $I=0$, and reduction of the cross section of the magnetic constriction 105, the angle of rotation $\rho$ can be reduced from an outset position up to a desired pressure difference $\Delta p$. Poles 106 and 107 approach each other from soft-iron yokes 100 and 103 to form a stray magnet field gap 108 which minimizes the magnetic field resistance established between yokes 100 and 103.

According to the invention, the air gap plane 109 of the pole shoe 90 and air gap plane 110 of the pole shoe 95 facing armature 85 are greater in cross-sectional dimension than air gap plane 111 of pole shoe 91 and air gap plane 112 of pole shoe 94. Therefore, armature 85 advances toward pole shoes 90, 95 in order to place impact plate 80 in closer communication with nozzle 76 to generate a greater pressure differential.

Under the hypothesis of a low internal magnetic resistance of the stray magnetic field poles 106, 107 it is thus possible to consider two magnetic component systems. For instance, in the first magnetic component system, pole shoes 95 and 90 are reduced in size by an amount indicated by the dash-line pole parts 95' and 90', respectively, which result in the greater air gap plane proportions of pole shoes 90 and 95 as compared to pole shoes 91 and 94. Thus, by deducting pole shoe portions 90' and 95', all four pole shoes will have identical air gap planes. In this arrangement, with an induction current I, a magnetic component system of this design demonstrates a flow of the torque in accordance with the dash-point-line $M_1$ as in FIG. 4. The strong progression of line $M_1$ with an induction current smaller than 0 is based upon the large magnitude of the angle of rotation of the armature, so that air gaps 93 and 97 on pole shoes 91 and 94 get increasingly smaller. As soon as moment $M_s$ is reached, which is essential for magnetic saturation, the moment of rotation $M_1$ does not decrease as rapidly, even with a continually decreasing induction current I.

The second magnetic component system comprises pole shoe elements 90' and 95' which are not part of the first magnetic component system. The electromagnetic field and the permanent magnetic field are thereby aligned with one another. With an induction current $I=0$ the permanent magnet 101 solely produces the rotation moment $M_o$ from permanent flow density. An induction current I produces an electromagnetic magnet-flow-density, resulting in a rotation moment $M_2$ in accordance with the solid line in FIG. 4; the rotation moment being proportionate to the square of the total of permanent flow density and electromagnetic magnet-flow-density. The total of rotation moment $M_1$ and $M_2$ results in a total rotation moment M on armature 85, as shown in dash-line in FIG. 4, and which is proportionate to the controlled pressure difference $\Delta p$.

In this way, a pressure control valve can be developed by way of which it is possible with a positive induction current I to establish, in a desired manner, a non-linear characteristic between induction current I and the pressure difference $\Delta p$, by means of an aperture of a secondary variable and without the provision of an additional non-linear electronic element.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A pressure control valve including a permanent magnet for producing a permanent magnetic field having a North and South polarity; an electromagnetic coil coupled with said permanent magnet for inducing an electromagnetic field; a pressure plate; a valve seat, said pressure plate opening said valve seat to a greater or lesser extent; an armature coupled with said pressure plate and located within said electromagnetic field induced by said electromagnetic coil and said permanent magnetic field; said armature being disc shaped and rotatably supported between two pairs of separate pole shoes disposed on a pair of yokes on opposite sides of said armature, which forms an air gap on opposite sides of said armature; said pole shoes located on said yokes on opposite sides of said armature having a same polarity induced by said permanent magnet; and one of said pair of yokes includes a magnetic restriction, said electromagnetic field at said pole shoes located on said yokes on opposite sides of said armature being arranged to extend in the same direction, whereas the electromagnetic field at the pole shoes aligned on opposite sides of the armature extends in an opposite direction of the permanent magnetic field, characterized in that upon rotational movement of said pressure plate in a direction of said valve seat, at least two pole shoes which are diagonally disposed on opposite sides of said armature provide a larger air gap surface area facing said armature than two other diagonally disposed pole shoes on opposite sides of said armature.

2. A pressure control valve as set forth in claim 1, characterized in that each said yoke includes one stray magnetic pole with said stray magnetic poles establishing a stray magnetic field gap between them.

* * * * *